(12) United States Patent
Ricci et al.

(10) Patent No.: US 10,047,654 B2
(45) Date of Patent: Aug. 14, 2018

(54) EXHAUST SYSTEM FOR AN INTERNAL COMBUSTION ENGINE AND METHOD FOR CONTROLLING THE EXHAUST SYSTEM

(71) Applicant: GM GLOBAL TECHNOLOGY OPERATIONS LLC, Detroit, MI (US)

(72) Inventors: Isadora Ricci, Turin (IT); Giovanni Montinaro, San Pietro Vernotico (IT); Emilie Reynier, Turin (IT); Riccardo Baria, Bruino (IT)

(*) Notice: Subject to any disclaimer, the term of this patent is extended or adjusted under 35 U.S.C. 154(b) by 49 days.

(21) Appl. No.: 15/354,649

(22) Filed: Nov. 17, 2016

(65) Prior Publication Data

US 2018/0135490 A1 May 17, 2018

(51) Int. Cl.
| | |
|---|---|
| *F01N 3/20* | (2006.01) |
| *F02B 37/02* | (2006.01) |
| *F01N 11/00* | (2006.01) |
| *F01N 3/28* | (2006.01) |
| *F01N 9/00* | (2006.01) |
| *B01D 53/94* | (2006.01) |
| *F01N 3/10* | (2006.01) |

(52) U.S. Cl.
CPC ......... *F01N 3/2053* (2013.01); *B01D 53/944* (2013.01); *B01D 53/9495* (2013.01); *F01N 3/103* (2013.01); *F01N 3/2803* (2013.01); *F01N 3/2825* (2013.01); *F01N 9/00* (2013.01); *F01N 11/002* (2013.01); *F02B 37/02* (2013.01); *F01N 2340/06* (2013.01); *F01N 2410/00* (2013.01); *F01N 2410/02* (2013.01); *F01N 2900/0414* (2013.01); *F01N 2900/08* (2013.01); *F01N 2900/1404* (2013.01)

(58) Field of Classification Search
CPC .... F01N 3/106; F01N 3/2066; F01N 13/0097; Y02T 10/24; Y02T 10/47
USPC ....... 60/274, 280, 286, 295, 299, 602, 605.2
See application file for complete search history.

(56) References Cited

U.S. PATENT DOCUMENTS

| | | | | | |
|---|---|---|---|---|---|
| 3,884,037 | A | * | 5/1975 | Barber | B01D 53/86 181/252 |
| 2008/0271442 | A1 | * | 11/2008 | Baumgartner | F01N 3/2066 60/302 |
| 2012/0304887 | A1 | * | 12/2012 | Gokhale | B61O 5/04 105/62.1 |
| 2015/0023854 | A1 | * | 1/2015 | Lim | B01D 53/9477 423/212 |
| 2015/0322848 | A1 | * | 11/2015 | Gokhale | B61C 5/04 60/602 |
| 2015/0361843 | A1 | * | 12/2015 | Hillen | F01N 3/0835 60/274 |

(Continued)

FOREIGN PATENT DOCUMENTS

JP 58079611 * 5/1983

OTHER PUBLICATIONS

Machine Translation of Abstract of JP 58079611. Done Mar. 1, 2018.*

*Primary Examiner* — Patrick Maines
*Assistant Examiner* — Dapinder Singh

(57) ABSTRACT

An exhaust system for an internal combustion engine for a vehicle includes a turbine positioned in an exhaust stream from the internal combustion engine, a first diesel oxidation catalyst positioned upstream of the turbine within the exhaust stream, and a bypass for selectively bypassing the exhaust stream around the diesel oxidation catalyst to the turbine.

2 Claims, 5 Drawing Sheets

(56) References Cited

U.S. PATENT DOCUMENTS

2016/0252028 A1   9/2016  Dutto et al.
2017/0089278 A1*  3/2017  Tulapurkar ......... F02D 41/0027
2017/0138317 A1*  5/2017  Gokhale ................ F02M 26/05

* cited by examiner

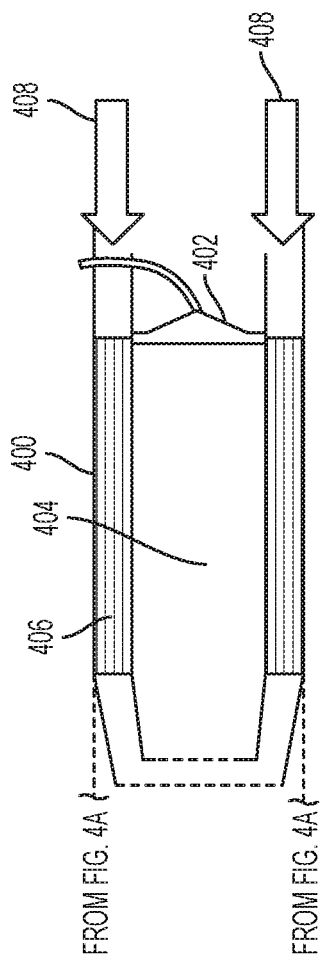
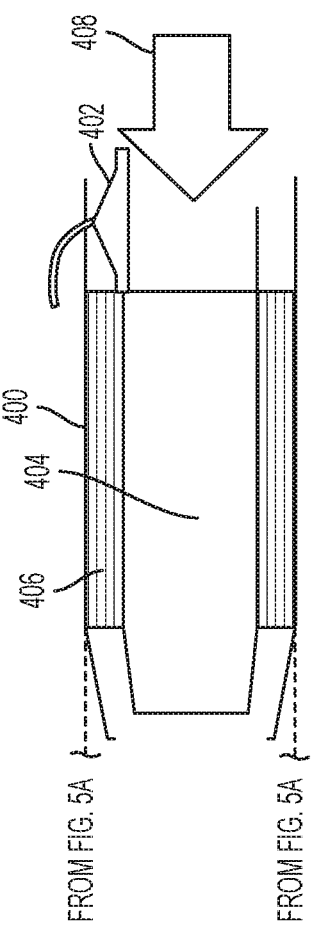
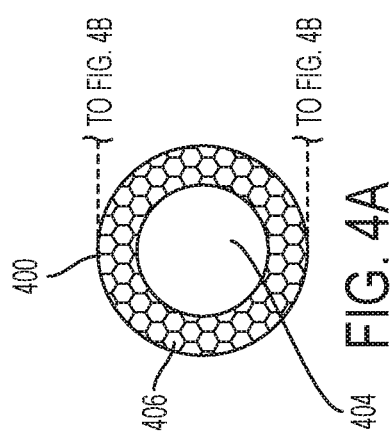
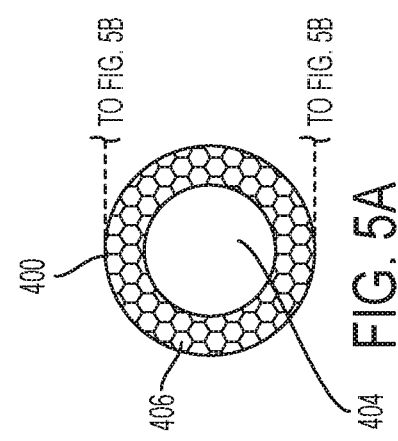

EXHAUST SYSTEM FOR AN INTERNAL COMBUSTION ENGINE AND METHOD FOR CONTROLLING THE EXHAUST SYSTEM

FIELD

The present disclosure relates to an exhaust system for an internal combustion engine and a method for controlling the exhaust system.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Exhaust systems for an internal combustion system having a turbocharger may also include a diesel oxidation catalyst (DOC) positioned downstream in the exhaust stream from the turbine of the turbocharger. The DOC oxidizes hydrocarbons (HC) and carbon monoxides (CO) into carbon dioxide (CO2) and water (H2O). The effectiveness of a DOC in relation to temperature is generally illustrated in FIG. 1.

FIG. 1 shows a graph 100 with a first axis 102 representing temperature and a second axis 104 representing a conversion percentage. An exemplary relationship between the conversion percentage for hydrocarbons (HC) for a DOC in relation to temperature is illustrated by line 106 and an exemplary relationship between the conversion percentage for carbon monoxides (CO) for a DOC in relation to temperature is illustrated by line 108. FIG. 1 clearly illustrates that the efficiency with which a DOC is capable of converting hydrocarbons (HC) and carbon monoxide (CO) is dependent upon temperature such that a lower temperature can result in a reduction in conversion percentage. Conversely, a higher temperature generally results in an increased conversion percentage.

The turbine in a turbocharger has an effect upon the temperature of the exhaust flowing through the exhaust stream and into the DOC. In particular, a turbine for a turbocharger will reduce the temperature of the exhaust stream and thus may adversely affect the efficiency of the DOC. The reduction in exhaust temperature means the DOC may have a reduction in conversion percentage.

One alternative that has been proposed is to move the DOC to a position upstream in the exhaust from the turbine. However, this configuration also has disadvantages. FIG. 2 is a graph 200 which represents time on the horizontal axis 202 and boost pressure on the vertical axis 204. The relationship of boost pressure to time for an exhaust configuration having a DOC positioned downstream of the turbine is represented by line 206 and the relationship of boost pressure to time for an exhaust configuration where the DOC is positioned upstream of the turbine is represented by line 208. As can be clearly seen, a substantial delay 210 in boost pressure is introduced when the DOC is moved from a post-turbine position to a pre-turbine position.

Another alternative that has been proposed is to provide a small DOC in a position upstream in the exhaust from the turbine and another DOC downstream from the turbine. This configuration also has disadvantages. For example, the small DOC will increase the back pressure in the exhaust to the engine. This may result in reduced performance at full load.

SUMMARY

In an exemplary aspect, an exhaust system for an internal combustion engine for a vehicle includes a turbine positioned in an exhaust stream from the internal combustion engine, a first diesel oxidation catalyst positioned upstream of the turbine within the exhaust stream, and a bypass for selectively bypassing the exhaust stream around the first diesel oxidation catalyst to the turbine.

In another exemplary aspect, the system further includes a second diesel oxidation catalyst positioned downstream of the turbine within the exhaust stream.

In another exemplary aspect, the system further includes a controller that is programmed to selectively activate the bypass.

In another exemplary aspect, the controller is programmed to activate the bypass during a transient condition of the internal combustion engine.

In another exemplary aspect, the transient condition comprises a throttle tip-in.

In another exemplary aspect, the controller is programmed to activate the bypass when a boost error exceeds a predetermined threshold.

In another exemplary aspect, the controller is programmed to activate the bypass when a temperature exceeds a predetermined threshold.

In another exemplary aspect, the temperature is an exhaust stream temperature.

In another exemplary aspect, the temperature is a coolant temperature.

In another exemplary aspect, the first diesel oxidation catalyst forms an annular coaxial shape.

In this manner, the bypass of the pre-turbine diesel oxidation catalyst provides the ability to take advantage of higher temperatures prior to the turbine in the exhaust stream to improve the conversion of hydrocarbons and carbon monoxide in comparison to a post-turbine DOC while also minimizing and/or avoiding any adverse impact upon turbine efficiency by selectively bypassing the pre-turbine DOC.

Additionally, the bypass minimizes and/or eliminates the back pressure from the pre-turbine diesel oxidation catalyst. Thus, providing the benefits of both improved DOC performance in some conditions while selectively enabling a reduced and/or eliminated back pressure from the pre-turbine DOC.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein:

FIG. 4A is a cross-sectional end view of an exemplary diesel oxidation catalyst and bypass in a first mode;

FIG. 4B is a cross-sectional side view of the exemplary diesel oxidation catalyst and bypass in the first mode;

FIG. 5A is a cross-sectional end view of the exemplary diesel oxidation catalyst and bypass in a second mode;

FIG. 5B is a cross-sectional side view of the exemplary diesel oxidation catalyst and bypass in the second mode.

DETAILED DESCRIPTION

Figure 1:
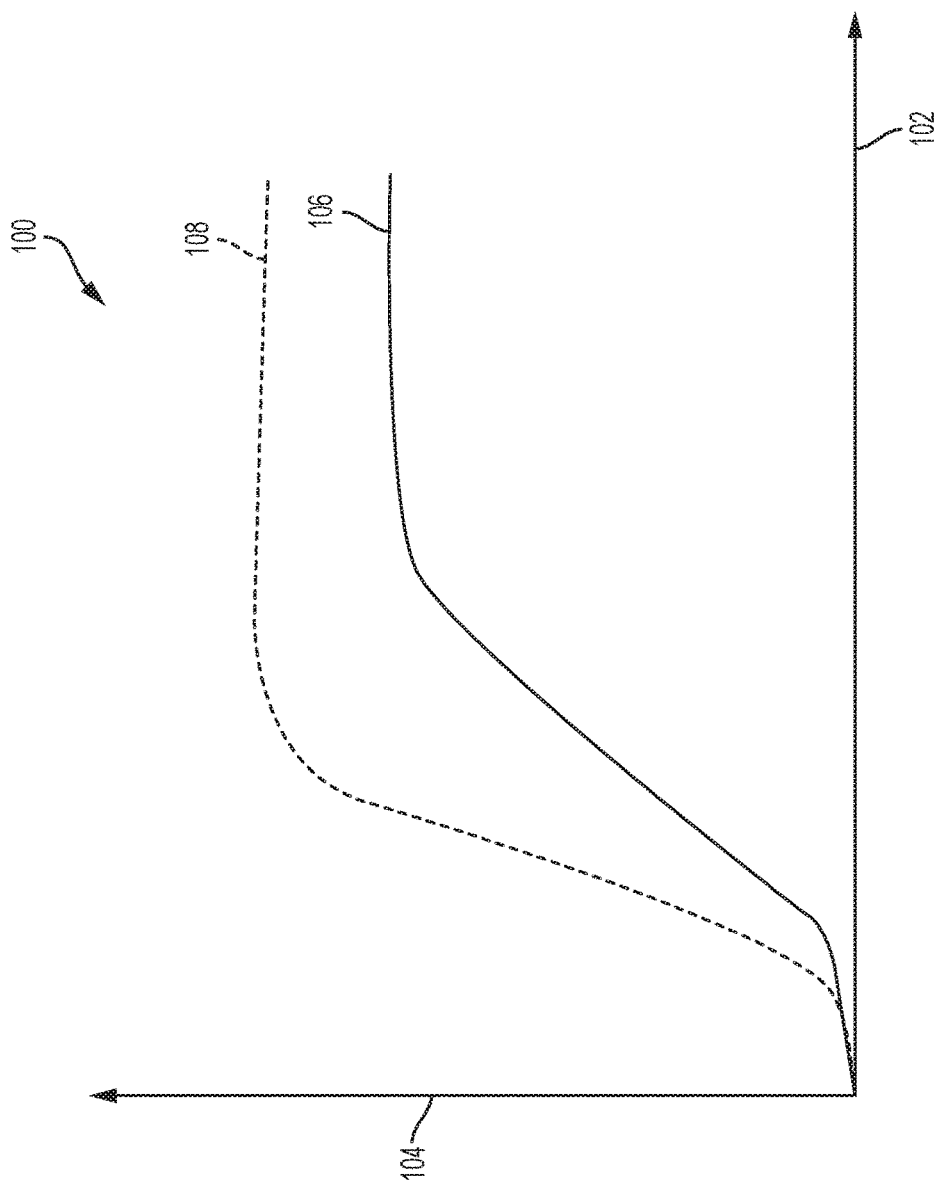
FIG. 1 is graph illustrating relationships between conversion percentage and temperature for a diesel oxidation catalyst.
Figure 2:
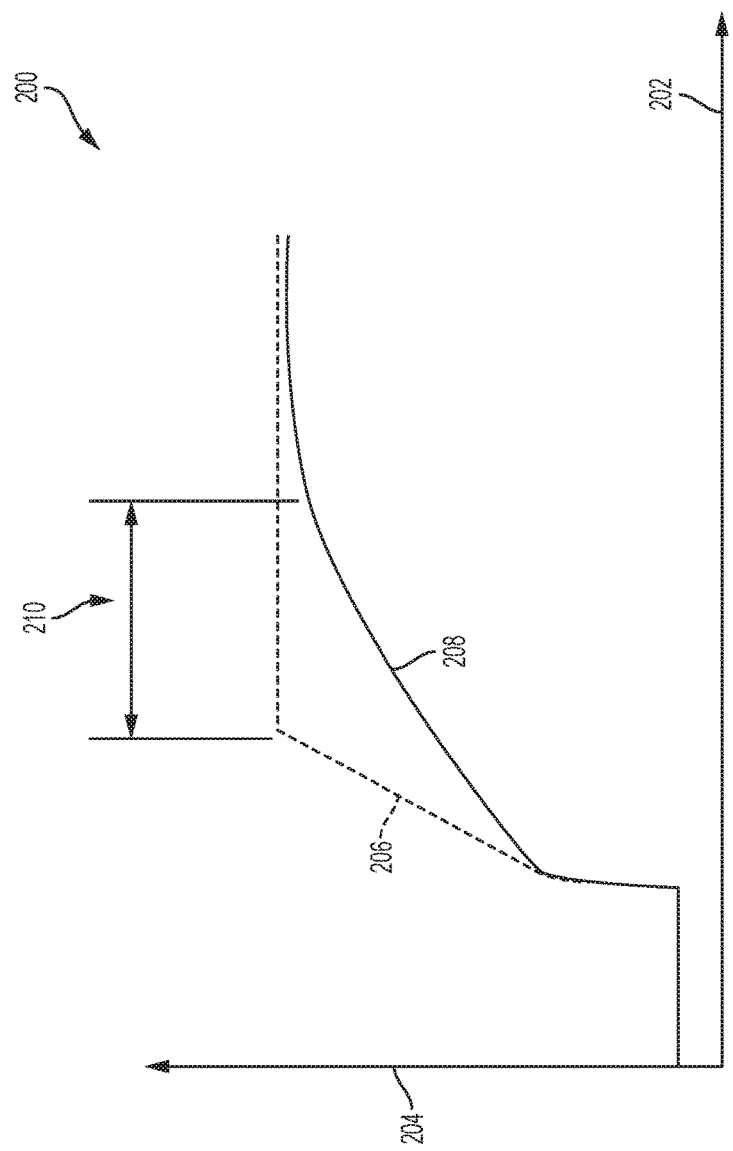
FIG. 2 is a graph illustrating the effect of diesel oxidation catalyst position upon the boost pressure for a turbine in an exhaust stream.
Figure 3:
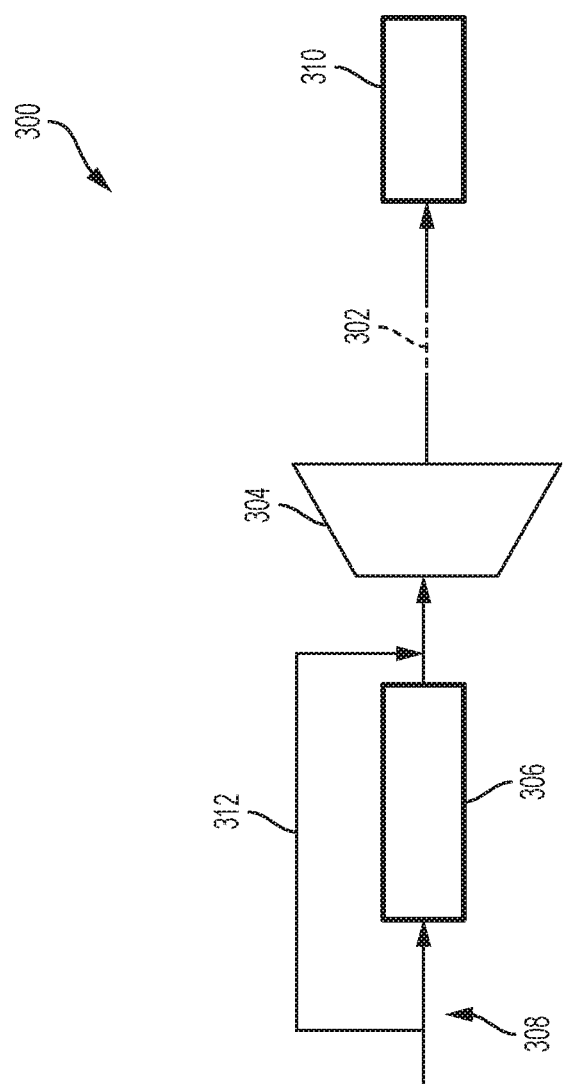
FIG. 3 is a schematic illustration of an exemplary exhaust system in accordance with the present disclosure.

Referring to FIG. 3, a schematic illustration of an exemplary embodiment of an exhaust system 300 in accordance with the present disclosure is shown. The exhaust system 300 includes an exhaust stream 302 which flows through the entire exhaust system 300. Those of ordinary skill in the art understand that the exhaust stream may originate from an internal combustion engine (not shown). The exhaust system 300 includes a turbine 304 positioned in the exhaust stream 302, a first diesel oxidation catalyst (DOC) 306 positioned upstream of the turbine 304 in the exhaust stream 302, and a bypass valve 308. The exemplary exhaust system 300 also includes a second diesel oxidation catalyst (DOC) 310 positioned downstream of the turbine 304 in the exhaust stream 302. The bypass valve 308 is operable to selectively cause the exhaust stream 302 to flow through the first DOC 306 or to flow through an alternate/bypass route 312, such that the exhaust stream 302 does not flow through the first DOC 306.

In one exemplary operating mode, the bypass valve 308 causes the exhaust stream 302 to flow through the alternate/bypass route 312 under most conditions. However, when conditions exist such that the second DOC 310 may not be substantially effective, the bypass valve 308 may cause the exhaust stream 302 to flow through the first DOC 306. For example, generally on engine start up the temperature of the exhaust stream 302 may be relatively low and the turbine 304 will only cause the temperature of that exhaust stream 302 to be lower by the time it encounters the second DOC 310. In this condition, the second DOC 310 may not be substantially effective. In this condition, while the overall temperature of the exhaust stream 302 may be relatively low, the temperature of the exhaust stream 302 encountering the first DOC 306 (before the turbine 304) will be higher than the temperature of the exhaust stream 302 encountering the second DOC 310. Thus, it is beneficial to take advantage of the higher temperature exhaust stream 302 at the pre-turbine, first DOC 306 in comparison to the lower temperature exhaust stream 302 at the post-turbine, second DOC 310 by permitting the exhaust stream 302 to flow through the DOC 306 and not through the bypass 312. Then, after the engine has operated for a period of time, the exhaust stream 302 may reach a temperature such that the second DOC 310 may become satisfactorily effective. In this condition, the bypass valve 308 may then be operated to cause the exhaust stream 302 to bypass the first DOC 306 by flowing through the alternate/bypass route 312.

Referring now to FIGS. 4A-5B, operation of an exemplary embodiment of a pre-turbine, DOC 400 with a bypass 402 is described. The cross-sectional end views of FIGS. 4A and 5A illustrate that the DOC 400 has a generally annular shape while the cross-sectional side views of FIGS. 4B and 5B together make it clear that the DOC 400 encompasses an internal, pipe-shaped or conical shaped volume 404. The DOC 400 includes catalyst material 406 in the annular volume surrounding the internal volume 404. The bypass 402 is selectively operable to close off the internal volume 404 and cause the exhaust stream 408 to flow through the catalyst material 406 to be treated as illustrated in FIGS. 4A and 4B. Alternatively, the bypass 402 is selectively operable to open the internal volume 404 such that the exhaust stream 408 flows through the internal volume 404 and, therefore, bypass the catalyst material 406. Preferably, the absence of catalyst material in the internal volume 404 permits the exhaust stream 408 to flow easily with minimal pressure loss. In this manner, the flow of the exhaust stream 408 may be selectively directed through the catalyst material 406 or through the internal volume 404. Closing the bypass 402 enables the pre-turbine DOC 400 to expose the exhaust stream to the catalyst material 406. Opening the bypass 402 enables the exhaust stream to bypass the catalyst material 406 such that the exhaust stream 408 flows relatively easily there through.

While FIGS. 4A-5B illustrate one exemplary embodiment, those of ordinary skill in the art understand that any configuration or shape for the pre-turbine DOC and bypass without limitation and remain within the scope of the present disclosure. For example, the bypass may form a simple poppet valve or the like, without limitation.

Figure 6:
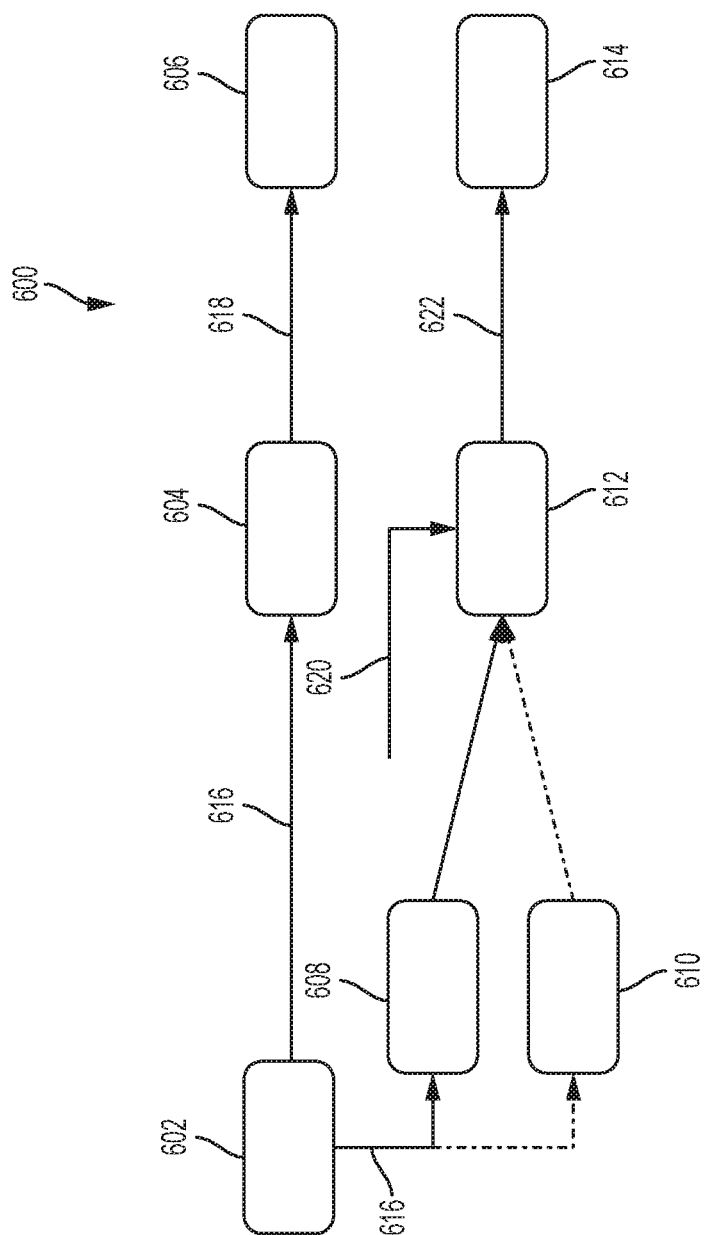
FIG. 6 is a schematic representation of a control strategy in accordance with an exemplary embodiment of the present disclosure.

FIG. 6 provides a schematic of a control strategy 600 in accordance with an exemplary embodiment of the present disclosure. The control strategy 600 includes a boost error function 602 which determines a boost error from a variable geometry turbine 606 (VGT) in an exhaust stream. The boost error 602 is a function of a comparison between a target boost from the VGT and actual boost from the VGT. A boost error value 616 is provided to a VGT command module 604 which may generate a duty cycle command 618 which is provided to the VGT 606. The VGT command module 604 may generate the duty cycle command 618 based upon a control strategy, such as a feed forward strategy, feedback strategy, a proportional-integral-derivative strategy, or the like in any useful combination without limitation. Those of ordinary skill in the art are familiar with such control strategies. The VGT 606 is responsive to the duty cycle command 618 received from the VGT command module 604. Components 602, 604, and 606 are conventional and are presently used to control VGT turbines in exhaust systems.

In the exemplary control scheme 600, a decision may be made about whether to control the bypass according to a closed loop type control scheme 608 or to control the bypass according to an open loop type control scheme 610. For example, a manifold pressure sensor may become or be unreliable such that it would not be desirable to control the system using closed-loop feedback from the manifold pressure sensor, in those instance, the decision may be to use an open loop type control scheme 610

The control scheme 600 also includes a bypass command arbitration module 612 which receives the preliminary decision about whether to bypass the pre-turbine DOC from one of the closed loop control scheme 608 or the open loop control scheme 610. The bypass command arbitration module may receive additional signals 620, such as, for example, engine coolant temperature, combustion mode, manifold absolute pressure, and the like, without limitation (others???). Based upon these additional signals 620 and the preliminary decision to bypass or not, the bypass command arbitration module outputs a bypass command 622 to the pre-turbine DOC bypass. The pre-turbine DOC bypass operates based upon the bypass command 622.

The control strategy 608 or 610 will give a preliminary indication about whether to bypass or not based upon the boost error signal 616. In general, the boost error 616 is an indication of a transient condition. For example, in the case of a fast throttle "tip-in" the target boost pressure may increase rapidly, however, the actual boost pressure feedback signal may not react immediately until the transient condition is completed. So, the boost error 616 in this instance may be large and exceed a predetermined threshold which may give an indication to cause the exhaust stream to bypass the pre-turbine DOC. There may be a different predetermined threshold depending upon the control strategy 608 or 610.

Further, in addition or as an alternative, the control scheme 600 may rely upon signals other than a boost error to determine whether to bypass or not. Other signals may include, for example, throttle position (or tip-in or rate of change), accelerometer signals, and the like without limitation and remain an exemplary embodiment of the present disclosure. In another example, the control scheme 600 may be responsive to operate the pre-turbine DOC bypass based upon fuel injection timing. When a late fuel injection event may be happening, such as, for example, when an exhaust valve is open such that heat may be generated in the exhaust stream which is intended to warm up post-turbine after treatment devices such as an SCR, or to regenerate a filter, or the like, the bypass may be opened to bypass the pre-turbine DOC to avoid oxidation of the catalyst in the pre-turbine DOC.

The exemplary control scheme 600 may be implemented within an engine control module (not shown) or any other controller, distributed or otherwise, as is understood by those of ordinary skill in the art, and remain an exemplary embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. An exhaust system for an internal combustion engine for a vehicle, comprising:
   a turbine positioned in an exhaust stream from the internal combustion engine;
   a first diesel oxidation catalyst positioned upstream of the turbine within the exhaust stream;
   a bypass for selectively bypassing the exhaust stream around the first diesel oxidation catalyst to the turbine; and
   a controller that is programmed to activate the bypass when a boost error exceeds a predetermined threshold.

2. A method for controlling a vehicle exhaust stream bypass of a diesel oxidation catalyst positioned upstream from a turbine in the exhaust stream, the method comprising:
   providing a turbine positioned in an exhaust stream from an internal combustion engine in a vehicle, a first diesel oxidation catalyst positioned upstream of the turbine within the exhaust stream, and a bypass for selectively bypassing the exhaust stream around the first diesel oxidation catalyst to the turbine; and
   generating a command to activate the bypass when a first signal exceeds a predetermined threshold, wherein the first signal comprises a boost error.

* * * * *